United States Patent [19]

Jacobs

[11] Patent Number: 4,890,679
[45] Date of Patent: Jan. 2, 1990

[54] GARDEN HOES FOR HOEING, SICKLEING, CHIPPING, AND CUTTING

[76] Inventor: Robert C. Jacobs, 305 E. McMillan #2, Cincinnati, Ohio 45219

[21] Appl. No.: 293,089

[22] Filed: May 17, 1989

[51] Int. Cl.⁴ .............................................. A01B 1/08
[52] U.S. Cl. ..................................... 172/371; 172/375
[58] Field of Search ................. 172/371, 375, 380, 378

[56] References Cited

U.S. PATENT DOCUMENTS

| | | | |
|---|---|---|---|
| 215,077 | 5/1879 | Stone | 172/380 |
| 893,627 | 7/1908 | Hosmer | 172/375 |
| 917,670 | 4/1909 | Shanks | 172/380 |
| 1,000,473 | 8/1911 | Wilson | 172/371 |
| 1,004,253 | 9/1911 | Hannegan | 172/375 |
| 1,113,984 | 10/1914 | Glass | 172/13 |
| 1,244,746 | 10/1917 | Kinzel | 172/13 |
| 1,329,176 | 1/1920 | Haugen | 172/13 |
| 1,503,143 | 7/1924 | Upton | 172/13 |
| 1,906,171 | 4/1933 | McNeal | 172/13 |
| 1,908,506 | 5/1933 | Buttress | 172/375 |
| 2,040,751 | 5/1936 | Marseilles | 172/380 X |
| 2,133,208 | 10/1938 | Nellis | 172/13 |
| 2,184,034 | 12/1939 | Broward | 172/13 |
| 3,029,878 | 4/1962 | McCulley | 172/13 |
| 3,065,801 | 11/1962 | Wood | 172/13 |
| 4,319,642 | 3/1982 | Merz | 172/13 |
| 4,377,211 | 3/1983 | Voss | 172/375 |
| 4,564,072 | 1/1986 | Corbett et al. | 172/13 |
| 4,611,666 | 9/1986 | Albertson | 172/13 |
| 4,645,010 | 2/1987 | Luedeman | 172/13 |
| 4,712,363 | 12/1987 | Claborn | 172/13 |

Primary Examiner—Richard J. Johnson

[57] ABSTRACT

A one-piece tool for performing controlled and exacting cuts for the removal of weeds 26 not susceptible to the strike of a horizontal hoe blade 24, as well as small limbs from trees and bushes, these by striking downward, the former by an oblique upward strike with the scythe-cutting edges 22.

4 Claims, 3 Drawing Sheets

GARDEN HOES FOR HOEING, SICKLEING, CHIPPING, AND CUTTING

BACKGROUND

1. Field of Invention

This invention relates to garden hoes, especially to hoes for use in facilitating scything, chipping, and cutting as well as hoeing in the popular sense during hand cultivation of soil thereof, and for performing a wide variety of other functions relative thereto.

2. Description of Prior Art

Many, if not most, users of the hoe are susceptible to the standard chop function of a straight thin blade to cultivate, cut weeds, and to aerate soil around vegetables and many other plants.

Heretofore a wide variety of garden hoes have been implemented for the purpose of hoeing, primarily in nurseries, weeding, gardening, and a serrated type for slide hoeing....

One such tool is a flat piece of metal sharpened on one edge and with the upper corners clipped, plus means to attach to a handle. It is more or less straight up and down and smaller, and used for cultivation in nurseries.

Another type of hoeing tool is a narrow stip of metal with a sharpened edge on the bottom and prongs protuding from the top portion. This type is used for weeding.

Still another type of hoe consists of a flat piece of metal with the bottom edge sharpened. The top portion is rounded off and contains means to attach to a handle. This type is used for gardening.

And another hoe type is much the same as the prior one except that its sharpened bottom edge is serrated. This serves two purposes in its use: (a) acts as a self sharpening device; and (b) facilitates hoeing in a slicing motion along the ground in a parallel motion.

None of these perform to the complete satisfaction of the user in that certain plants are impervious to the stroke of an edge on a flat piece of metal. Most users, therefore, would find it desirable to have a tool which could facilitate the cutting and removal of large fibrous weeds, small bushes and other resistant growth with the same tool that removes the more tender aspects of garden trash.

OBJECTS AND ADVANTAGES

Accordingly, applicant claims the following as his objects and advantages of the invention: to provide a tool for easily, reliably, and neatly slicing and extracting an intractable and fibrous weed from its growing place; to provide a tool for clipping and cutting small limbs from bushes and small trees; to provide a tool which requires a minimum of skill and training to use; and to provide a tool which can do a complete job of scything, chipping, cutting, and hoeing without the need of adjuncts.

In addition applicant claims the additional objects and advantages: to provide a garden tool which can remove weeds of a tough and fibrous nature in a novel manner by scything them obliquely with a left or right side of its special means through the stem, with safety and versatility; and to provide such a tool which can handle a variety of stem thicknesses with ease.

Readers will find further objects and advantages of the invention from a consideration of the ensuing description and the accompanying drawings.

DRAWING FIGURES

Figure 1:
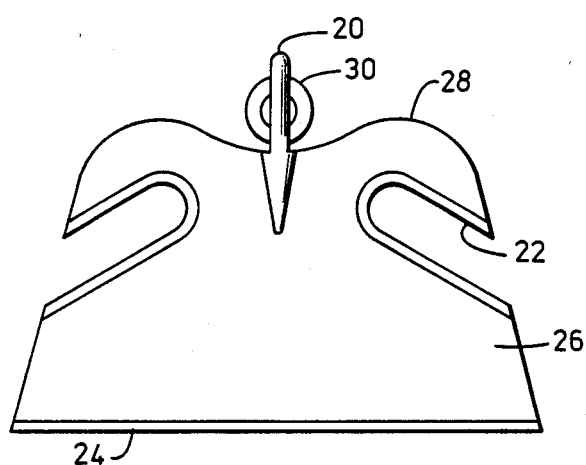
FIG. 1 shows an end view of a one-piece tool according to the invention.
Figure 3:
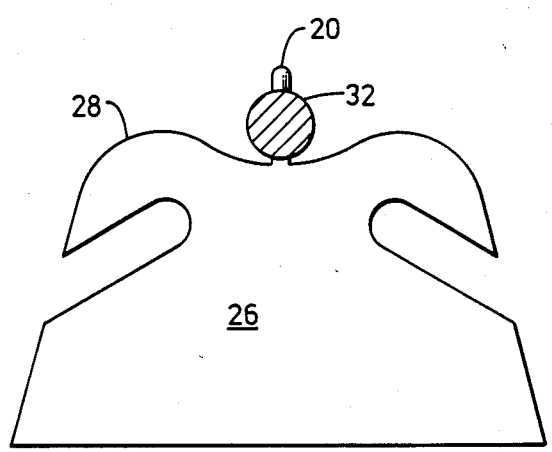
FIG. 3 shows a back view of a one-piece tool according to the invention.

DRAWING REFERENCE NUMERALS 20 prong for the attachment to handle
22 scythe-cutting sections
24 horizontal cutting edge
26 face of one-piece tool
28 shoulder of one-piece tool
30 handle recess for receiving prong
32 handle

SINGLE-PIECE TOOL DESCRIPTION

Figure 2:
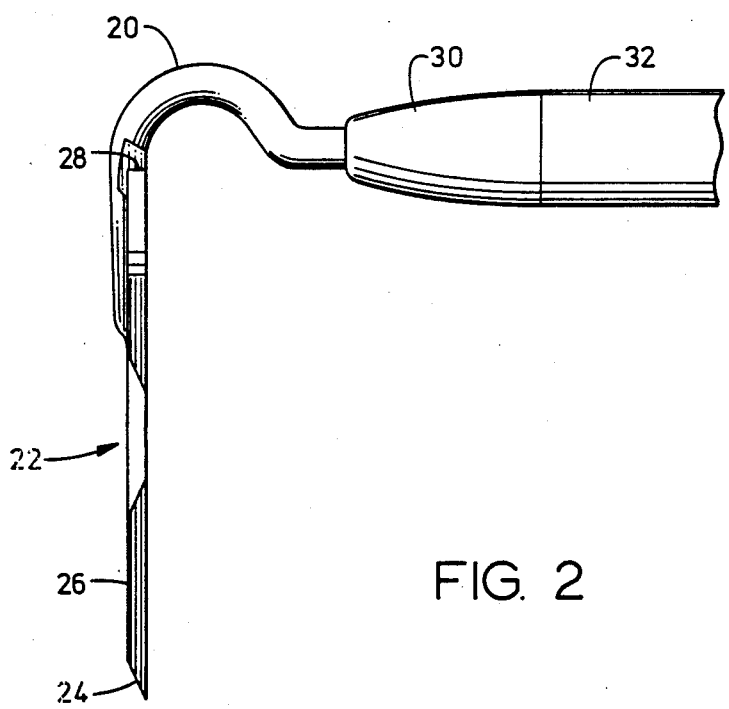
FIG. 2 shows a side view with a prong extending from a one-piece tool for fitting into handle.
Figure 4:
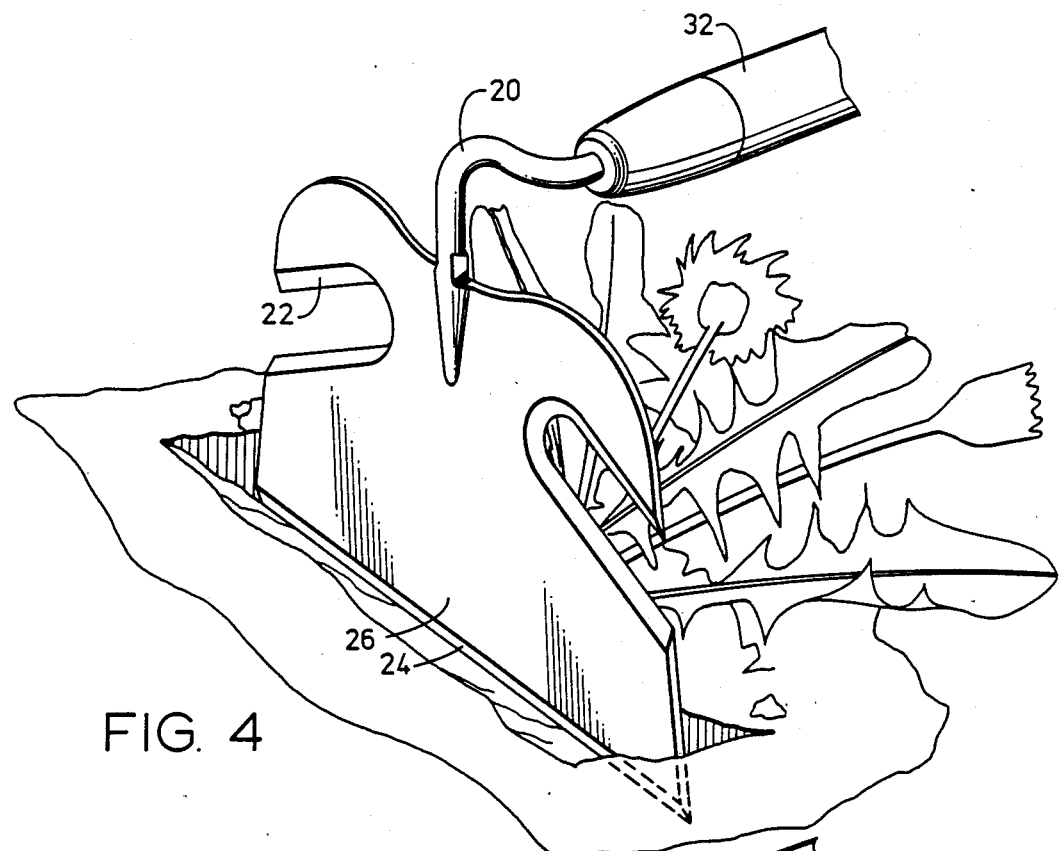
FIG. 4 shows standard use of front edge of one-piece tool
Figure 5:
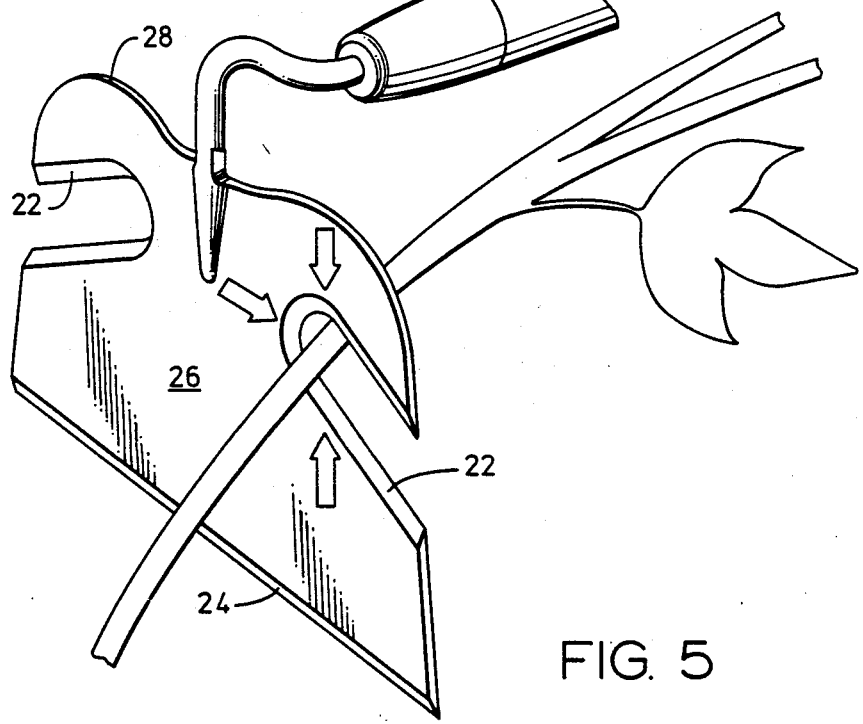
FIG. 5 shows scything and cutting of heavy weed with scythe-shaped cutout in either side of one-piece tool.
Figure 6:
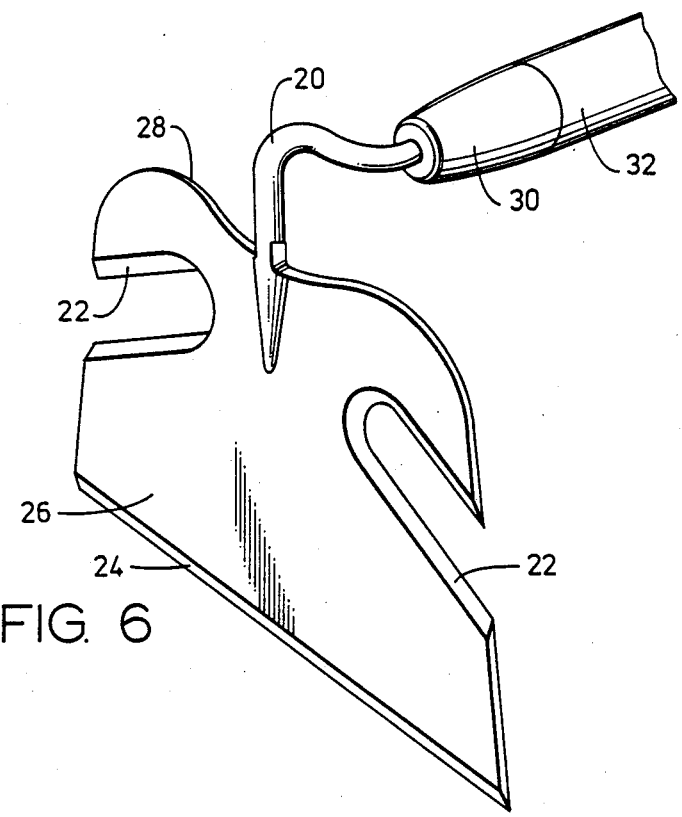
FIG. 6 shows a sharpened edge of scythe-shaped cutout on left and right sides of one-piece tool.
Figure 7:
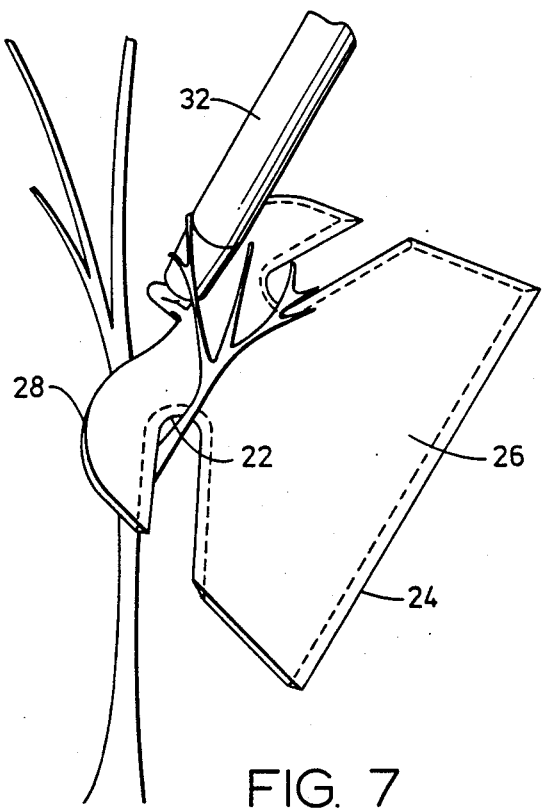
FIG. 7 shows downward chipping of small limbs of a bush with the scythe cutout.

FIG. 1 shows a single-piece tool approximately 15 cm wide on the cutting edge 24, according to the preferred embodiment of the invention. FIG. 2 shows a 1 cm round prong 20 for insertion into handle 32 recess 30 by pressure. This prong 20 is approximately 15 cm long with a 3 cm rise from the top edge of the one-piece tool and repairing into a 5 cm bend to a straight section of 7 cm. Approximately 5 cm of the prong 20 is inserted into the handle 32 recess 30, said handle being approximately 124 cm long.

The Scythe-cutting portions 22 are approximately 2 cm wide, entering at an angle upward 3 cm from the horizontal cutting edge 24 and extends into the one-piece tool 5 cm on the bottom side and 3 cm on the top side. The one-piece tool may be formed by stamping the face 26 and welding on the prong 20.

The stamped one-piece tool face 26 would be 16 cm across the bottom, 10 cm high at the shoulders 28, 9 cm high at handle recess 30, and 14 cm across the top from shoulder to shoulder 28.

This one-piece tool should be made from good steel yet soft enough to be cut by file and stone to resharpen in the field.

SINGLE-PIECE TOOL OPERATION

The single-piece tool of FIG. 1 will perform a wide variety of scything, chipping, cutting, and hoeing functions. Users will find the tool most useful for removal of stubborn, fibrous weeds impervious to head-on blows of the horizontal blade. Top operate, the user merely hooks with the scythe-like feature on either side of the tool and clips out the weed with an oblique upward motion. The scythe portions may be turned facing downward to strike limbs on bushes, thus clipping them away from their lower extensions on a tree or bush. This one-piece tool precludes bending for those physically unable to pull weeds by hand and which present a problem to an ordinary hoe.

While the above description contains many specificities, the reader should not construe these as limitations on the scope of the one-piece tool invention, but merely as exemplifications of the preferred embodiments thereof. Those skilled in the art will envision many other possibilities and variations within in scope. For example, skilled artisans will readilybe able to change the dimensions and shapes of the various embodiments. They can make many variations.on the scythe sections 22, raising or lowering or diminishing the size and shape of the section.

Accordingly, the reader is requested to determine the scope of the invention is to be determined by the appended claims and their legal equivalents, and not by the examples which have been given.

I claim:

1. A garden hoe for performing controlled hacking strokes or oblique upward cuts, as well as downward chipping and chopping on weeds and small plants and limbs, or the like, comprising:
    a one-piece generally rectangular steel plate, one edge thereof being horizontal and sharpened, and with opposite vertical side edges thereof each having a single inwardly and upwardly extending recessed portion with sharpened generally parallel edges adapted to be used selectively with the sharpened horizontal edge,
    means for attaching said one-piece tool to a handle comprising a prong extending from the top central portion of said tool with a holding ferrule means secured thereto,
    handle means secured to said attaching means whereby a user may manually manipulate said plate so that said sharpened recess edges may be used in a down stroke to cut weeds and woody plants, or in a generally oblique upward stroke to cut plants stems or small limbs, or by using a chipping downward stroke to cut earth using said horizontal edge.

2. The garden hoe of claim 1 wherein said prong is attached to a central portion of the plate at a generally right angle.

3. The garden hoe of claim 2 wherein each side edge has a generally rounded shoulder at the upper corner thereof and extends inward to the central portion of the plate.

4. The garden hoe of claim 3 wherein the side edges taper slightly from the base to the rounded shoulders.

* * * * *